(12) United States Patent
Specht

(10) Patent No.: US 6,311,918 B1
(45) Date of Patent: Nov. 6, 2001

(54) DEVICE FOR WINDING AND UNWINDING A SEAT BELT

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/491,215

(22) Filed: Jan. 25, 2000

(30) Foreign Application Priority Data

Feb. 11, 1999 (DE) .............................................. 199 05 703

(51) Int. Cl.[7] .................................................. B60R 22/38
(52) U.S. Cl. ...................... 242/382; 242/379; 242/379.1; 242/379.2; 280/805; 297/472
(58) Field of Search ................................. 242/379, 379.1, 242/379.2, 382; 280/805; 297/468, 470, 471, 472

(56) References Cited

U.S. PATENT DOCUMENTS

| 3,961,761 | * | 6/1976 | Wiesbock | 242/107.4 A |
| 4,002,219 | * | 1/1977 | Steinmann | 180/82 C |
| 4,529,143 | * | 7/1985 | Kanada et al. | 242/107 |
| 4,588,144 | * | 5/1986 | Nishimura | 242/107 |
| 4,726,537 | * | 2/1988 | Escaravage | 242/107 |
| 5,553,802 | * | 9/1996 | Park et al. | 242/372 |
| 5,618,006 | * | 4/1997 | Sayles | 242/379.1 |
| 5,934,597 | * | 8/1999 | Ludwig | 242/379.1 |
| 6,216,972 | * | 4/2001 | Rohrle | 242/379.1 |

FOREIGN PATENT DOCUMENTS

| 2709843 A1 | 9/1977 | (DE) . |
| 2724622 A1 | 12/1978 | (DE) . |
| 2737272 A1 | 3/1979 | (DE) . |
| 2742676 A1 | 4/1979 | (DE) . |
| 2742676 | 5/1979 | (DE) . |
| 3527475 A1 | 3/1986 | (DE) . |
| 4112620 | 5/1992 | (DE) . |
| 4112620 A1 | 5/1992 | (DE) . |
| 4332205 | 3/1995 | (DE) . |
| 4332205 A1 | 3/1995 | (DE) . |
| 19647842 A1 | 5/1998 | (DE) . |
| 19826305 A1 | 12/1998 | (DE) . |
| 29816280 U1 | 3/1999 | (DE) . |

* cited by examiner

Primary Examiner—Donald P. Walsh
Assistant Examiner—Mark J Beauchaine
(74) Attorney, Agent, or Firm—Lonnie Drayer

(57) ABSTRACT

A device for winding and unwinding a seat belt has an electric drive which supplies a torque to a belt reel that is loaded in the belt winding direction by a motive spring. The motive spring can be wound to a blocking configuration by the torque.

19 Claims, 5 Drawing Sheets

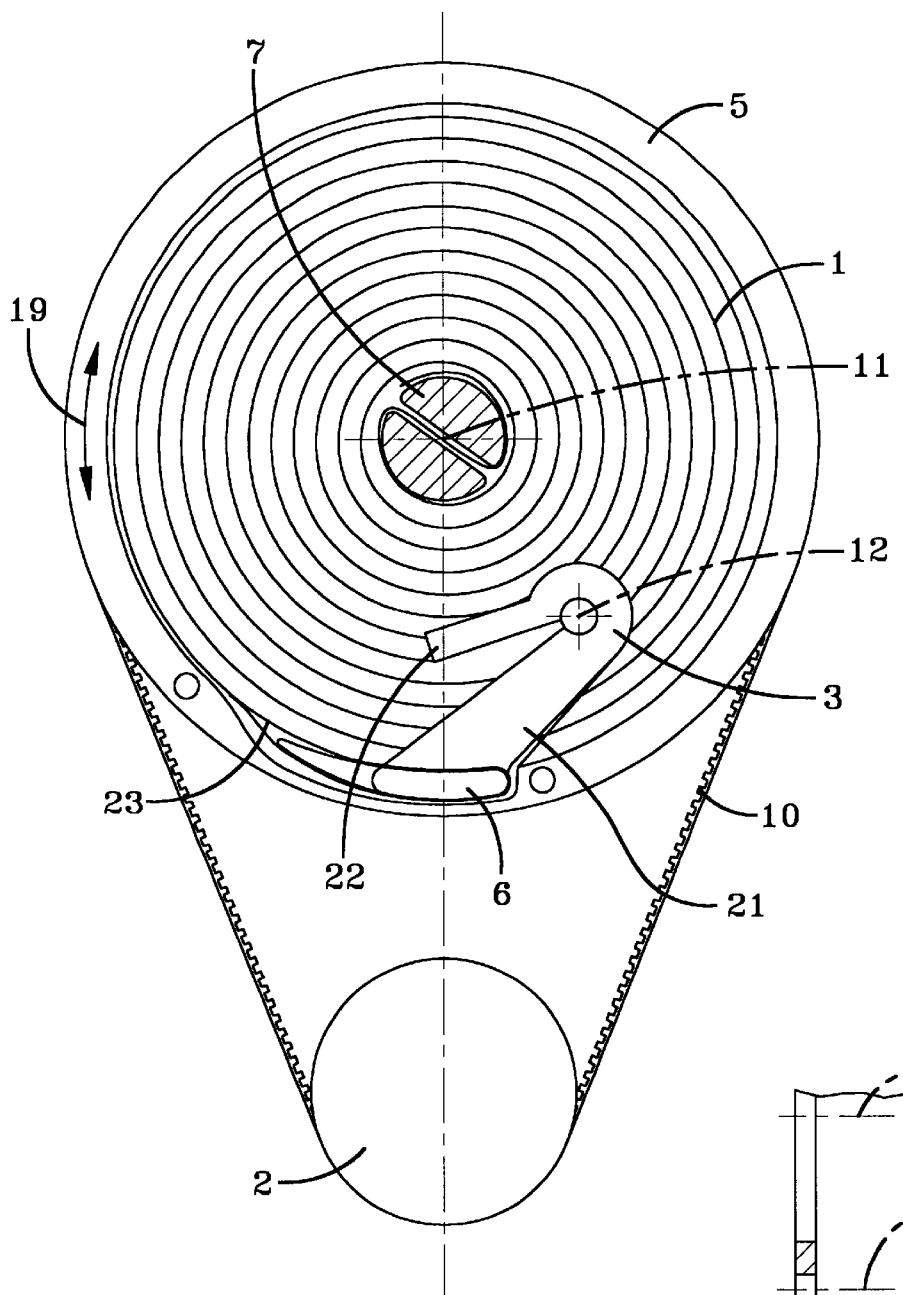
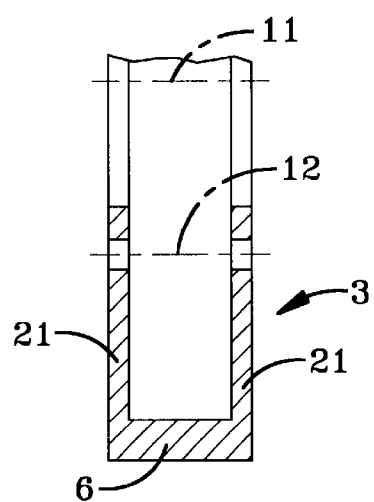
FIG-1
FIG-2

DEVICE FOR WINDING AND UNWINDING A SEAT BELT

FIELD OF THE INVENTION

The invention relates to a device for winding and unwinding a seat belt with an electric drive.

DISCUSSION OF THE PRIOR ART

A device of for winding and unwinding a seat belt is taught by DE 41 12 620 A1. With the known winder for seat belts, the belt reel is loaded by an electric motor such that, when the seat belt is applied, the application force exerted by the motive spring is lower than the retraction force exerted on the belt webbing on application of the seat belt, in particular when the belt webbing is brought back into the parking position. A spring spool in which the motive spring is mounted rotates on the belt retractor frame for this purpose and the electric motor acts on this spring spool. The restoring force of the motive spring can be increased or reduced by rotating the spring spool.

DE 43 32 205 teaches a device wherein a torque is transmitted to a belt reel of a belt winder loaded by a motive spring by an electric drive below a value which is critical for power tightening in order to pretighten a seat belt wound onto the belt reel. In particular, during abrupt braking which leads to a change of speed below a critical value, a feeling of security is imparted to the belted-in vehicle occupant. Below the limit of deceleration or acceleration that is critical for power tightening, pretightening of the belt is achieved by rotating the winding shaft in the belt winding direction. The torque required for this purpose is provided by an electric motor, in particular a direct-current motor. This electric motor can also be used to adjust comfort during application and wearing of the seat belt.

It is also known from DE 27 42 676 A1 and DE 41 12 620 A1 to rotate, using an electric drive (electric motor) acting as a servomotor, a rotatably mounted spring spool of the motive spring which is fixed by its outer end on the spring spool, in order to adjust the application force of the seat belt webbing in a comfortable manner, or to increase the spring force by rotation of the spring spool for rapid winding of the seat belt on removal of the seat belt.

SUMMARY OF THE INVENTION

With the present invention, the torque produced by the electric drive, in particular an electric motor (direct-current motor) can be transmitted via the motive spring that is wound to a blocking configuration onto the belt reel. This results from pretightening the seat belt. Furthermore, not only torques originating from the electric motor can be transmitted via the spring wound to a blocking configuration onto the belt reel, but also forces originating from the belt reel can be caused to act on energy absorbers, for example load limiters, via the spring wound to a blocking configuration. These energy absorbers or load limiters are preferably connected to the outer end of the spring. This can involve, for example, decelerating guidance of the webbing by means of which the outer end of the motive spring is guided, for example, around deflection points having a decelerating effect. Furthermore, the electric motor can act additionally, or solely, as an energy absorber. Decelerated forward movement of the belted-in vehicle occupant can thus be achieved when the belt reel is blocked.

The transmission of torque is preferably dampened during winding to a blocking configuration. A damping element can be provided in the flow of force between the electric drive and the belt reel for this purpose. The damping element is so designed that, by a change of form, it allows a rotational relative movement between a part of the motive spring, for example the spring arbor or the outer fixing point of the motive spring on a rotatable motive spring spool, and the belt reel during the winding of the motive spring to a blocking configuration. This relative movement preferably takes place within a specific rotational angle before attainment of the complete blocking position of the motive spring. Preferably the damping element is elastically deformable. The damping element can be the carrier of the load limiter that has a decelerating effect on the end of the motive spring.

Furthermore, the comfort to the vehicle occupant of the applied seat belt can be adjusted in a known manner by the electric drive by appropriate loading of the motive spring, in particular via the rotatable motive spring spool, as known, for example, from DE 27 42 676 or DE 41 12 620 A1. The traction force of the motive spring can also be increased in this way during belt retraction in the parking position after removal of the seat belt.

BRIEF DESCRIPTION OF THE DRAWINGS

Exemplary embodiments of the invention will be described in more detail hereinafter with reference to the figures, in which:

FIG. 1 shows a first embodiment of the invention in the normal operating position;

FIG. 2 is a fragmentary sectional view of the embodiment of FIG. 1;

DETAILED DESCRIPTION OF THE INVENTION

Figure 3:
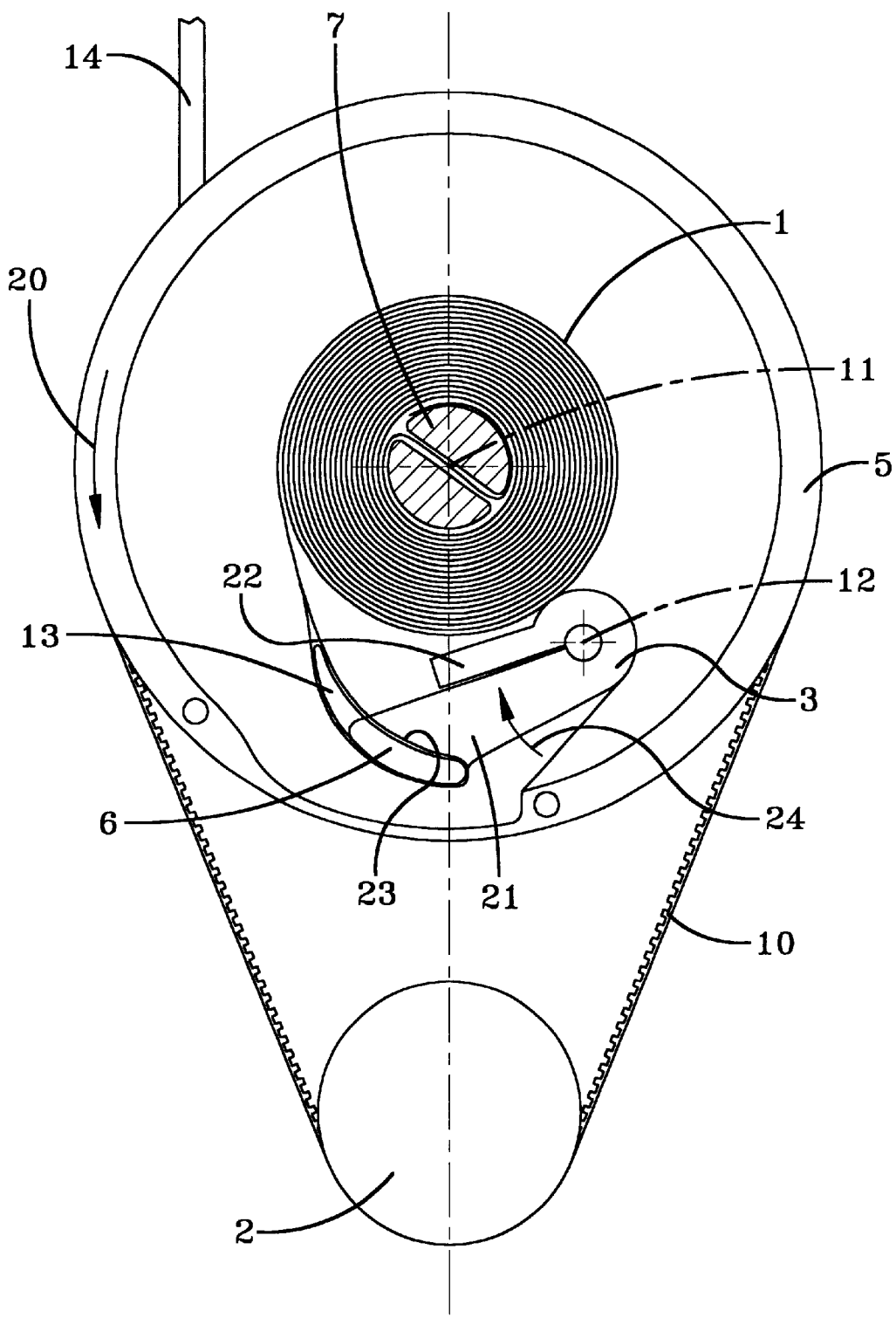
FIG. 3 shows the embodiment of FIG. 1 with the motive spring wound to a blocking configuration.

The illustrated embodiments show only the components required for understanding of the invention. The invention is used in a belt winder in which a belt reel 4 (FIG. 4) is loaded by a motive spring 1 in the winding up direction of a seat belt 14. The belt reel 4 is mounted in a frame 8 so that it rotates around a belt reel axis 11. In order to improve the comfort of wearing a seat belt, a torque can be transmitted by an electric drive 2 which can be designed as a direct-current motor via a toothed belt 10 to a motive spring spool 5 which is rotatable about the belt reel axis 11. Torque transmission can also be effected by a gear arrangement, as known from DE 41 12 620 A1, instead of the toothed belt 10. The force of the motive spring 1 can be increased for winding the seat belt 14 into the parking position and the belt retraction force of the motive spring can be reduced to improve the comfort of the applied seat belt for a vehicle occupant. The motive spring spool 5 is rotated in the appropriate direction (double arrow 19 in FIG. 1) for this purpose.

To pretighten the seat belt below a level that is critical for power tightening, the motive spring 1 is wound to a blocking configuration, as shown in FIG. 3. For this purpose, the motive spring spool 5 is driven in a direction of rotation illustrated by an arrow 20 in FIG. 3 by the electric drive 2 via the toothed belt 10. As soon as the motive spring 1 is wound to a blocking configuration (FIG. 3), the torque produced by the electric drive 2 is transmitted to the belt reel 4 to tighten the belt. This pretightening takes place, in particular, in the range of early detection of a crash or during emergency stops. Furthermore, pretightening of the seat belt can be achieved before the beginning of the crash by the electric drive. For achieving the blocking position required for this purpose of the motive spring 1 on a spring arbor 7, a rapid rotational movement of the motive spring housing 5 is produced by the electric drive 2 upon a start signal for pretightening. The pretightening of the belt is effected by further rotation in the blocking position of the motive spring 1 in the winding up direction of rotation 20. An almost direct non-positive connection between the electric drive 2 and the belt reel 4 is produced by the blocking position of the motive spring 1.

To avoid excessive mechanical stresses, in particular hard impacts, at the transition from normal belt retractor mode, in particular the comfort mode of the belt winder in which the motive spring has the state shown in FIG. 1, into the blocking position, damping devices are provided in the embodiments according to FIGS. 1 to 5.

In the embodiment shown in FIGS. 1 to 3, there is a damping element in the form of an elastic or resilient lever 3 at the outer end of the motive spring 1 at which the motive spring 1 is connected to the rotatable motive spring spool 5. In the embodiment illustrated, the outer fixing contour for the motive spring is provided on the damping element. The damping element consists of the elastic lever 3. This possesses a lever arm 22 supported on the motive spring spool 5. The support can be provided on the two spring cartridge lids of the motive spring spool 5. The lever arm 22 is supported rigidly on the motive spring spool 5. The elastic lever 3 also possesses a resiliently movable lever arm 21. This movable lever arm 21 pivots around a lever axis 12. For this purpose, the elastic lever 3 can be of plastic material and can be elastic or resilient in design in its transition region between the two lever arms 21 and 22 or owing to the material properties of the lever material. As shown, in particular, in FIG. 2, the lever arm 21 is U-shaped with a transversely extending beam having a fixing point 6 for the outer end of the motive spring 1. The outer end of the motive spring 1 is shaped to a fixing loop 23 which is wrapped around the fixing point 6 designed as a transverse beam.

At the transition into the blocking position, the fixing point 6 is deformed within a specific angular range owing to the resiliency of the elastic lever 3 forming the damping element. The deformation occurs owing to a pivoting movement that takes place substantially round the lever axis 12 and also relative to the belt reel 4 as indicated by arrow 24 in FIG. 3. Therefore, the transition into the blocking position of the motive spring 1 takes place not abruptly but in a dampened manner. Damping is achieved owing to the deformation work during elastic deformation of the lever 3.

A resilient projection 13 around which the fixing loop 23 is also wrapped and which therefore imparts resilient and therefore additionally dampening properties to the fixing point 6 can also be provided at the fixing point (transverse beam) 6.

In the embodiment shown in FIGS. 1 to 3, the lever arm 21 which is deformed resiliently at the transition into the blocking position extends at an angle to the direction which is radial with respect to the belt reel axis 11. This lever arm can also be guided radially or substantially radially with respect to the belt reel axis 11. In the embodiment shown in FIGS. 1 to 3, the motive spring fixing at the fixing point 6 is loaded to a relatively low extent at the transition into the blocking position of the motive spring 1.

Figure 4:
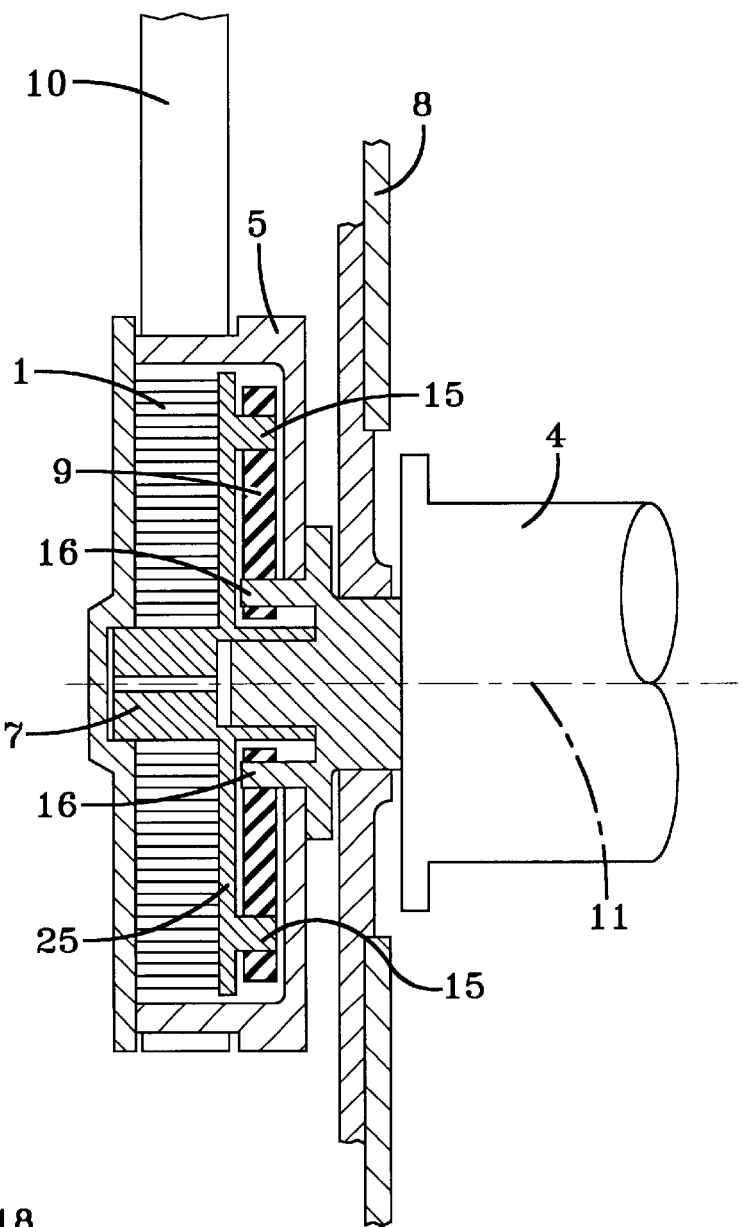
FIG. 4 is a sectional view of a second embodiment.
Figure 5:
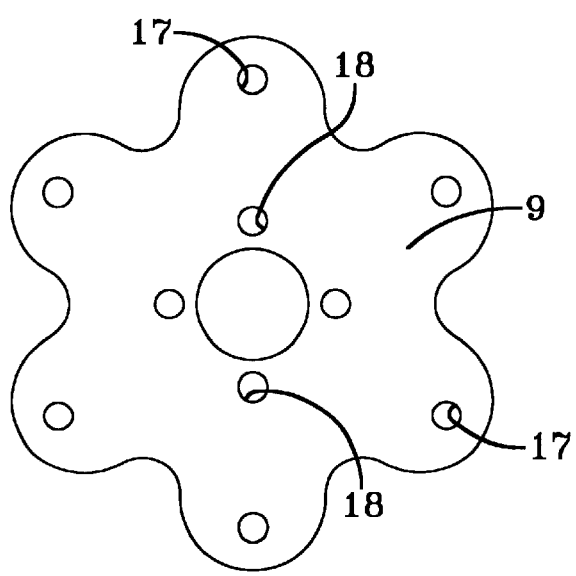
FIG. 5 is a plan view of a damping element used in the embodiment of FIG. 4.

In the embodiment shown in FIG. 4, an elastic damping disc 9 is used as damping element. FIG. 5 is a plan view of an embodiment of this damping disc 9. Engagement bore holes 17, 18 are provided on two different radii on the elastic damping disc 9. The engagement bore holes 18 in which engagement bolts 16 fastened on the belt reel 4 engage are located on an inner radius. The engagement bore holes 18 in which engagement bolts 15 rigidly connected to the spring arbor 7 engage are located on an outer radius. The engagement bolts 15 can be shaped on a disc 25 connected rigidly to the spring arbor 7. The elastic damping disc 9 can be substantially star-shaped with the outer engagement bore holes 17 being located in the region of the projections of the star.

The embodiment shown in FIG. 4 therefore possesses a damping element that is provided between the spring arbor 7 and the belt reel 4. The elastic damping disc 9 can be of plastic material. In particular, the region located between the radii of the engagement bore holes 17, 18 or of the engagement bolts 15, 16 is flexibly deformable. A relative rotation of a part of the motive spring 1, namely of the spring arbor 7, relative to the belt reel 4 is also obtained in this way at the transition into the blocking position of the motive spring 1. Preferably, the elastic damping disc 9 is arranged coaxially to the belt reel axis 11, as shown in FIG. 4. In order to bring the motive spring 1 into the blocking position, a torque is produced by the electric drive 2 and transmitted to the motive spring spool 5 as in the previously described embodiment, so that the motive spring 1 is brought into the blocking position during rotation of the motive spring spool 5. The rotary motion of the electric drive 2 can also be transmitted to the motive spring spool 5 by gear engagement instead of the toothed belt 10 shown in FIG. 4.

With the motive spring wound to a blocking configuration (FIG. 3), the electric drive, in particular electric motor 2, can act as an energy absorber, during a forward movement of the strapped-in vehicle occupant in the event of a crash as a load-limiting energy absorber. The extraction forces exerted by the belt webbing are transmitted via the belt reel and the motive spring wound to the electric motor, which can be switched, into the opposite direction.

Figure 6:
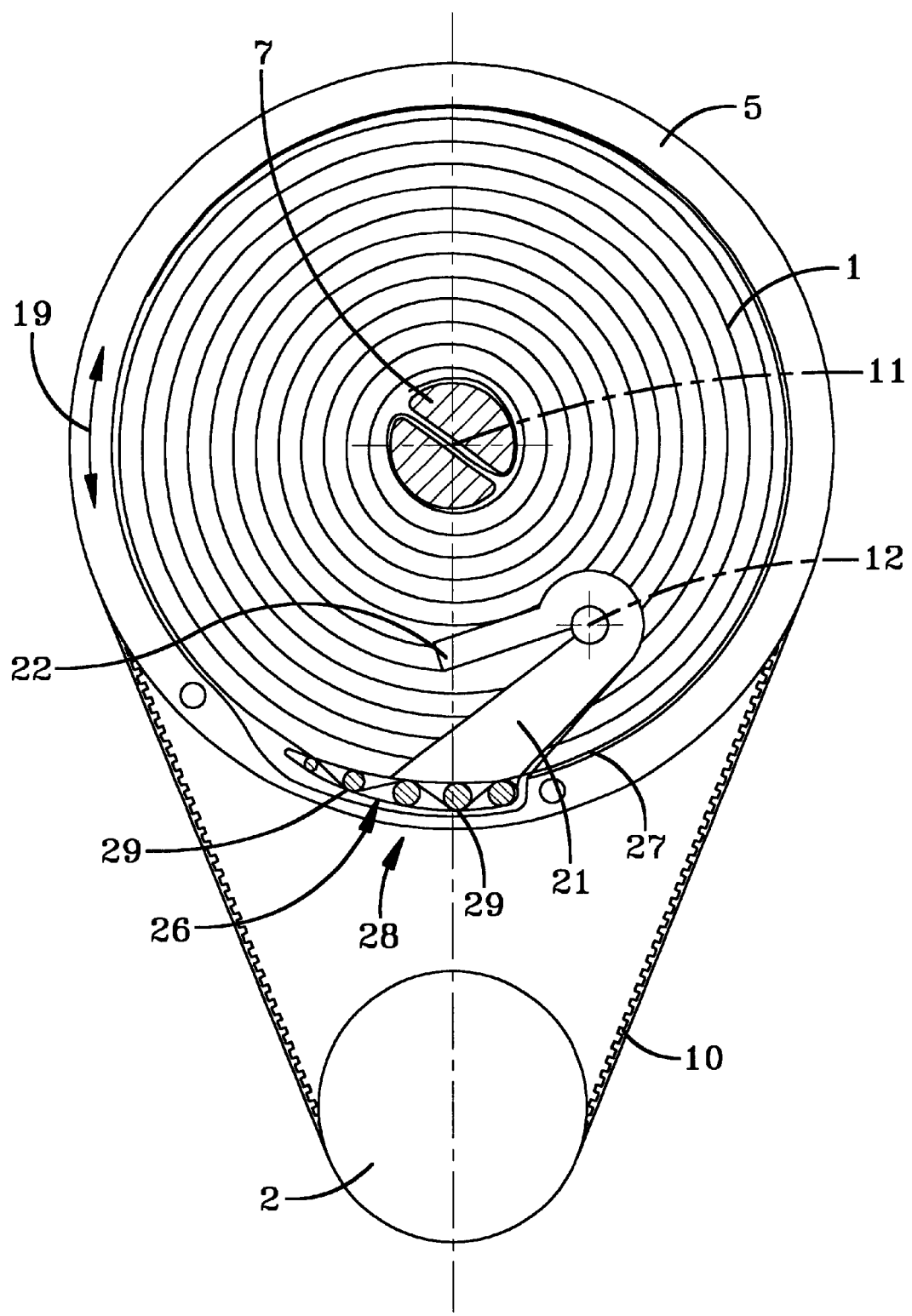
FIG. 6 shows an embodiment in which a load limiter is formed at the end of the spring, in the normal operating position.
Figure 7:
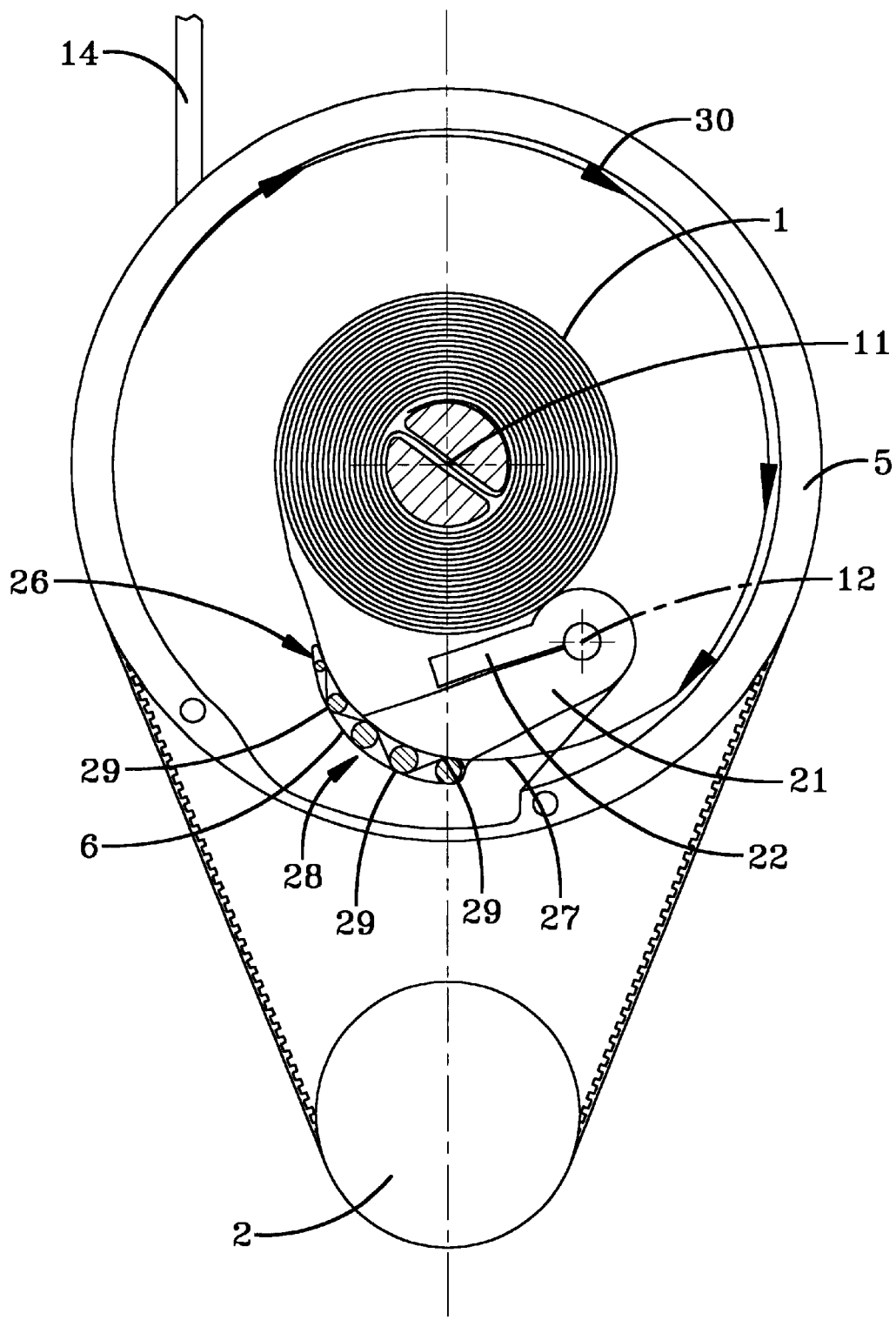
FIG. 7 shows the embodiment of FIG. 6 with the motive spring wound to a blocking configuration and active load limiter.

In the embodiment in FIGS. 6 and 7, an energy absorber is provided as load limiter 26 at the end of the motive spring. This load limiter comprises of a decelerating webbing guide 28 with deflection points 29 around which an end piece 27 of the motive spring is wrapped in a substantially serpentine manner. The end piece of the motive spring is preferably soft annealed in order to achieve the serpentine guidance in the webbing guide 28 of the load limiter 26. In the embodiment illustrated, the load limiter 26 or the webbing guide 28 is provided on the damping device at the end of the lever arm 21. It acts as the fixing point 6 in the embodiments in FIGS. 1 to 3. FIG. 6 shows the normal operating position. The motive spring is wound to a blocking configuration in FIG. 7. The end piece 27 is guided through the deflection points 29 of the load limiter 26 with a decelerated pulling direction 30 owing to the extraction forces exerted by the seat belt during the forward movement of the occupant. In addition, an opposing moment can be produced with an increased decelerating force by the electric motor 2 by rotation of the motive spring spool 5 in a counterclockwise direction (FIG. 7). This opposing moment can also be produced if the entire end piece 27 is guided to a stop by the webbing guide 28 producing the load-limiting effect. In the embodiments illustrated, a holding device, for example in the form of shearing pins which trigger a rotation of the belt reel decelerated by the load limiter when a load limiter threshold is exceeded, is provided between the blocking device and the belt reel.

Many changes and modifications in the above-described embodiments of the invention can, of course, be carried out without departing from the scope thereof. Accordingly, that scope is intended to be limited only by the scope of the appended claims.

What is claimed is:

1. A device for winding and unwinding a seat belt comprising an electric drive which supplies a torque to a belt reel loaded in a belt winding direction by a motive spring, wherein the motive spring can be wound to a blocking configuration by the torque, a damping element being arranged in the flow of force between the electric drive and the belt reel.

2. The device for winding and unwinding a seat belt according to claim 1 wherein torques can be transmitted to the belt reel and from the belt reel via the motive spring wound to a blocking configuration.

3. The device for winding and unwinding a seat belt according to claim 1 wherein the motive spring can be wound to a blocking configuration in a dampened manner.

4. The device for winding and unwinding a seat belt according to claim 1 wherein a rotational relative movement between a part of the motive spring and the belt reel takes place during winding to a blocking configuration of the motive spring owing to a change of shape of the damping element.

5. The device for winding and unwinding a seat belt according to claim 1 wherein damping is provided during a specific rotational angle before attainment of the complete blocking position of the motive spring.

6. The device for winding and unwinding a seat belt according to claim 1 wherein the torque supplied by the electric drive can be transmitted to a rotatable motive spring spool which surrounds the motive spring and to which an outer end of the motive spring is connected.

7. The device for winding and unwinding a seat belt according to claim 1 wherein the damping element is resilient.

8. The device for winding and unwinding a seat belt according to claim 1 wherein the damping element is provided at the fixing point of the motive spring on the motive spring spool.

9. The device for winding and unwinding a seat belt according to claim 1 wherein the damping element is provided between a spring arbor and the belt reel.

10. The device for winding and unwinding a seat belt according to claim 1 wherein the torque is transmitted by a toothed belt.

11. The device for winding and unwinding a seat belt according to claim 1 wherein the force of the motive spring can be adjusted to comfort mode and/or parking-position mode by the electric drive.

12. The device for winding and unwinding a seat belt according to claim 1 wherein torque transmitted by the belt reel can be transmitted to an energy consumer.

13. The device for winding and unwinding a seat belt according to claim 12 wherein the energy consumer is a load limiter for forces exerted on a vehicle occupant's body by the seat belt.

14. The device for winding and unwinding a seat belt according to claim 13 wherein the load limiter is provided with a motive spring spool at a connecting point of the motive spring.

15. The device for winding and unwinding a seat belt according to claim 12 wherein an outer end piece of the motive spring is pulled by a webbing guide with energy consumption when a stress above a load limit is transmitted via the motive spring wound to a blocking configuration.

16. The device for winding and unwinding a seat belt according to claim 15 wherein the webbing guide exerts a decelerating effect on the end piece of the motive spring.

17. The device for winding and unwinding a seat belt according to claim 16 wherein the webbing guide comprises a plurality of deflection points for the end piece of the motive spring.

18. The device for winding and unwinding a seat belt according to claim 1 wherein the load limiter is located on the damping element.

19. The device for winding and unwinding a seat belt according to claim 1 wherein the torque of the electric drive can be transmitted to the belt reel via the motive spring wound to a blocking configuration during pretightening of the seat belt.

* * * * *